(12) United States Patent
Nakano

(10) Patent No.: US 12,043,986 B2
(45) Date of Patent: Jul. 23, 2024

(54) WORK VEHICLE AND METHOD FOR CONTROLLING WORK VEHICLE

(71) Applicant: KOMATSU LTD., Tokyo (JP)

(72) Inventor: Yuichi Nakano, Tokyo (JP)

(73) Assignee: KOMATSU LTD., Tokyo (JP)

( * ) Notice: Subject to any disclaimer, the term of this patent is extended or adjusted under 35 U.S.C. 154(b) by 224 days.

(21) Appl. No.: 17/797,545

(22) PCT Filed: Mar. 8, 2021

(86) PCT No.: PCT/JP2021/008975
§ 371 (c)(1),
(2) Date: Aug. 4, 2022

(87) PCT Pub. No.: WO2021/187196
PCT Pub. Date: Sep. 23, 2021

(65) Prior Publication Data
US 2023/0055738 A1    Feb. 23, 2023

(30) Foreign Application Priority Data

Mar. 16, 2020    (JP) ................... 2020-045460

(51) Int. Cl.
*G06F 7/70* (2006.01)
*B60K 31/00* (2006.01)
(Continued)

(52) U.S. Cl.
CPC ............ *E02F 9/2253* (2013.01); *B60K 31/00* (2013.01); *F16H 61/42* (2013.01);
(Continued)

(58) Field of Classification Search
CPC combination set(s) only.
See application file for complete search history.

(56) References Cited

U.S. PATENT DOCUMENTS

2016/0084275 A1    3/2016    Kaneko et al.
2021/0140143 A1    5/2021    Oasa

FOREIGN PATENT DOCUMENTS

JP    6-191317 A    7/1994
JP    2011-169351 A    9/2011
(Continued)

OTHER PUBLICATIONS

The International Search Report for the corresponding international application No. PCT/JP2021/008975, issued on Mar. 30, 2021.

*Primary Examiner* — Adam M Alharbi
(74) *Attorney, Agent, or Firm* — Global IP Counselors, LLP

(57) ABSTRACT

When an inclination angle is greater than or equal to a first threshold, a controller determines a displacement of a hydraulic pump from a command vehicle speed based on second pump data and determines a displacement of a hydraulic motor from the command vehicle speed based on second motor data. The second pump data defines the displacement of the hydraulic pump that is smaller than that of first pump data with respect to the command vehicle speed. The second motor data defines the displacement of the hydraulic motor that is smaller than that of first motor data with respect to the command vehicle speed.

12 Claims, 5 Drawing Sheets

(51) Int. Cl.
  *E02F 9/22*       (2006.01)
  *F16H 61/42*      (2010.01)
  *F16H 59/44*      (2006.01)
  *F16H 59/66*      (2006.01)

(52) U.S. Cl.
  CPC ...... *B60K 2031/0091* (2013.01); *F16H 59/44* (2013.01); *F16H 2059/663* (2013.01)

(56) References Cited

FOREIGN PATENT DOCUMENTS

| | | | |
|---|---|---|---|
| KR | 20130014330 A | * | 3/2013 |
| WO | 2016/042649 A1 | | 3/2016 |
| WO | 2019/003760 A1 | | 1/2019 |

* cited by examiner

WORK VEHICLE AND METHOD FOR CONTROLLING WORK VEHICLE

CROSS-REFERENCE TO RELATED APPLICATIONS

This application is a U.S. National stage application of International Application No. PCT/JP2021/008975, filed on Mar. 8, 2021. This U.S. National stage application claims priority under 35 U.S.C. § 119(a) to Japanese Patent Application No. 2020-045460, filed in Japan on Mar. 16, 2020, the entire contents of which are hereby incorporated herein by reference.

TECHNICAL FIELD

The present invention relates to a work vehicle and a method for controlling the work vehicle.

BACKGROUND INFORMATION

A work vehicle is provided with a hydrostatic transmission including a hydraulic pump and a hydraulic motor. In a hydrostatic transmission, the hydraulic pump is driven by an engine and the hydraulic motor is driven by hydraulic fluid discharged from the hydraulic pump. The hydraulic motor drives a travel device. As a result, the work vehicle travels. The displacement of the hydraulic pump and the displacement of the hydraulic motor are controlled in response to the vehicle speed whereby the transmission gear ratio of the hydrostatic transmission is changed in a stepless manner in response to the vehicle speed.

A technique has been proposed in the prior art for preventing overspeed of an engine in a work vehicle provided with a hydrostatic transmission. In Japanese Patent Laid-open No. H6-191317 for example, the amount of increase in velocity of a work vehicle when traveling downhill is detected. The displacement of the hydraulic pump is changed so as to reduce the vehicle speed.

SUMMARY

The object of the afore-mentioned technique is to protect the engine. However, the rotation speed of the hydraulic motor increases due to the increase in velocity when traveling downhill even before the engine reaches overspeed. In this case, the flow rate of the hydraulic motor may exceed a permissible value. In addition, if the vehicle speed is reduced to protect the hydraulic motor after the velocity has actually increased, a sudden deceleration will be required. In this case, operability of the work vehicle is reduced. An object of the present disclosure is to suppress a reduction in operability and prevent an excessive increase in the flow rate of a hydraulic motor due to an increase in velocity when traveling downhill in a work vehicle provided with a hydrostatic transmission.

A work vehicle according to one aspect of the present disclosure includes an engine, a hydrostatic transmission, a travel device, an inclination sensor, and a controller. The hydrostatic transmission includes a hydraulic pump, a hydraulic circuit, and a hydraulic motor. The hydraulic pump is driven by the engine. The hydraulic circuit is connected to the hydraulic pump. The hydraulic motor is connected to the hydraulic pump through the hydraulic circuit. The travel device is driven by the hydraulic motor. The inclination sensor detects an inclination angle of the vehicle. The controller controls the displacement of the hydraulic pump and the displacement of a hydraulic motor.

The controller determines a command vehicle speed. The controller acquires the inclination angle. When the inclination angle is less than a first threshold, the controller determines the displacement of the hydraulic pump from the command vehicle speed based on first pump data and determines the displacement of the hydraulic motor from the command vehicle speed based on first motor data. The first pump data defines a relationship between the command vehicle speed and the displacement of the hydraulic pump. The first motor data defines a relationship between the command vehicle speed and the displacement of the hydraulic motor. When the inclination angle is greater than or equal to the first threshold, the controller determines the displacement of the hydraulic pump from the command vehicle speed based on second pump data and determines the displacement of the hydraulic motor from the command vehicle speed based on second motor data. The second pump data defines a displacement of the hydraulic pump that is smaller than that of the first pump data with respect to the command vehicle speed. The second motor data defines a displacement of the hydraulic motor that is smaller than that of the first motor data with respect to the command vehicle speed.

A control method according to another aspect of the present invention is a control method for a work vehicle. The work vehicle includes a hydrostatic transmission. The hydrostatic transmission includes a hydraulic pump, a hydraulic circuit, and a hydraulic motor. The hydraulic pump is driven by an engine. The hydraulic circuit is connected to the hydraulic pump. The hydraulic motor is connected to the hydraulic pump through the hydraulic circuit. The method according to the present aspect includes the following processes.

A first process is determining a command vehicle speed. A second process is acquiring an inclination angle of the work vehicle. A third process is determining the displacement of the hydraulic pump from the command vehicle speed based on first pump data and determining the displacement of the hydraulic motor from the command vehicle speed based on first motor data, when the inclination angle is less than a first threshold. The first pump data defines a relationship between the command vehicle speed and the displacement of the hydraulic pump. The first motor data defines a relationship between the command vehicle speed and the displacement of the hydraulic motor. A fourth process is determining the displacement of the hydraulic pump from the command vehicle speed based on second pump data and determining the displacement of the hydraulic motor from the command vehicle speed based on second motor data, when the inclination angle is equal to or greater than the first threshold. The second pump data defines a displacement of the hydraulic pump that is smaller than that of the first pump data with respect to the command vehicle speed. The second motor data defines a displacement of the hydraulic motor that is smaller than that of the first motor data with respect to the command vehicle speed.

Effect of the Invention

According to the present disclosure, when an inclination angle is greater than or equal to a first threshold, the displacement of a hydraulic pump is determined from the command vehicle speed based on the second pump data and the displacement of the hydraulic motor is determined from the command vehicle speed based on the second motor data.

The second pump data defines a displacement of the hydraulic pump smaller than that of first pump data with respect to the command vehicle speed. As a result, the displacement of the hydraulic pump is reduced more when the inclination angle is equal to or greater than the first threshold than when the inclination angle is less than the first threshold. In addition, the second motor data defines a displacement of the hydraulic motor smaller than that of the first motor data with respect to the command vehicle speed. As a result, the displacement of the hydraulic motor is reduced more when the inclination angle is equal to or greater than the first threshold than when the inclination angle is less than the first threshold. Consequently, an excessive increase of the flow rate of the hydraulic motor due to an increase in the velocity when traveling downhill is prevented. In addition, the reduction in the displacement of the hydraulic pump and the reduction in the displacement of the hydraulic motor are determined according to the inclination angle. As a result, the displacement of the hydraulic pump and the displacement of the hydraulic motor can be reduced at an early timing when traveling downhill. Consequently, a reduction in operability is suppressed.

DESCRIPTION OF EMBODIMENTS

Figure 1:
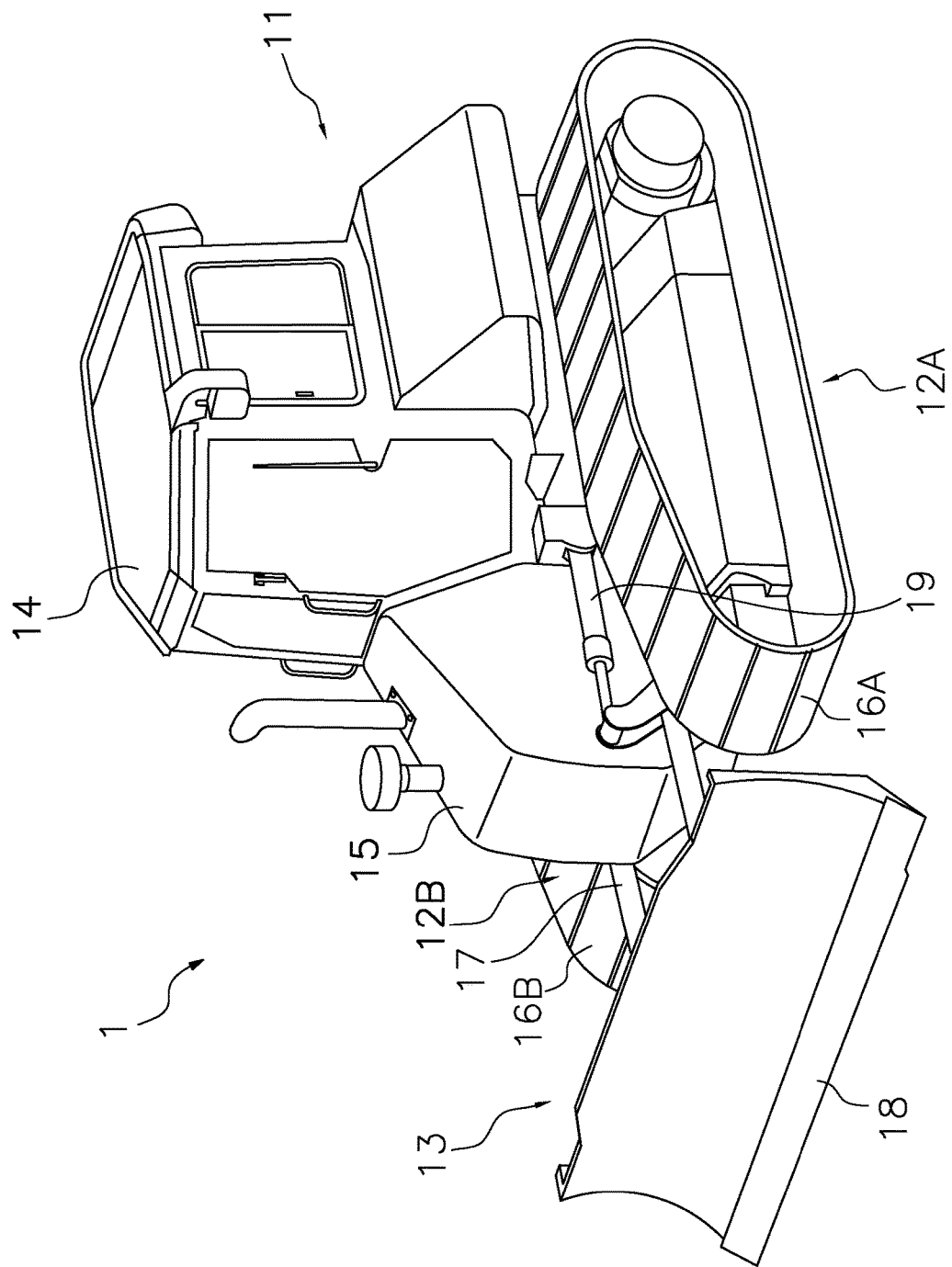
FIG. 1 is a perspective view of a work vehicle according to an embodiment.

An embodiment of the present disclosure will be explained in detail with reference to the drawings. FIG. 1 is a perspective view of a work vehicle 1 according to an embodiment. The work vehicle 1 is a bulldozer according to the present embodiment. The work vehicle 1 includes a vehicle body 11, travel devices 12A and 12B, and a work implement 13.

The vehicle body 11 includes an operating cabin 14 and an engine room 15. An operator's seat that is not illustrated is disposed inside the operating cabin 14. The engine room 15 is disposed in front of the operating cabin 14. The travel devices 12A and 12B are attached to a lower portion of the vehicle body 11. The travel devices 12A and 12B include a first travel device 12A and a second travel device 12B. The first travel device 12A and the second travel device 12B are disposed so as to be aligned on the left and right. The first travel device 12A includes a first crawler belt 16A. The second travel device 12B includes a second crawler belt 16B. The work machine 1 travels due to the rotation of the crawler belts 16A and 16B.

The work implement 13 is attached to the vehicle body 11. The work implement 13 has a lift frame 17, a blade 18, and a lift cylinder 19. The lift frame 17 is attached to the vehicle body 11 movably up and down. The lift frame 17 supports the blade 18. The blade 18 is disposed in front of the vehicle body 11. The blade 18 moves up and down accompanying the up and down movements of the lift frame 17. The lift cylinder 19 is coupled to the vehicle body 11 and the lift frame 17. Due to the extension and contraction of the lift cylinder 19, the lift frame 17 moves up and down.

Figure 2:
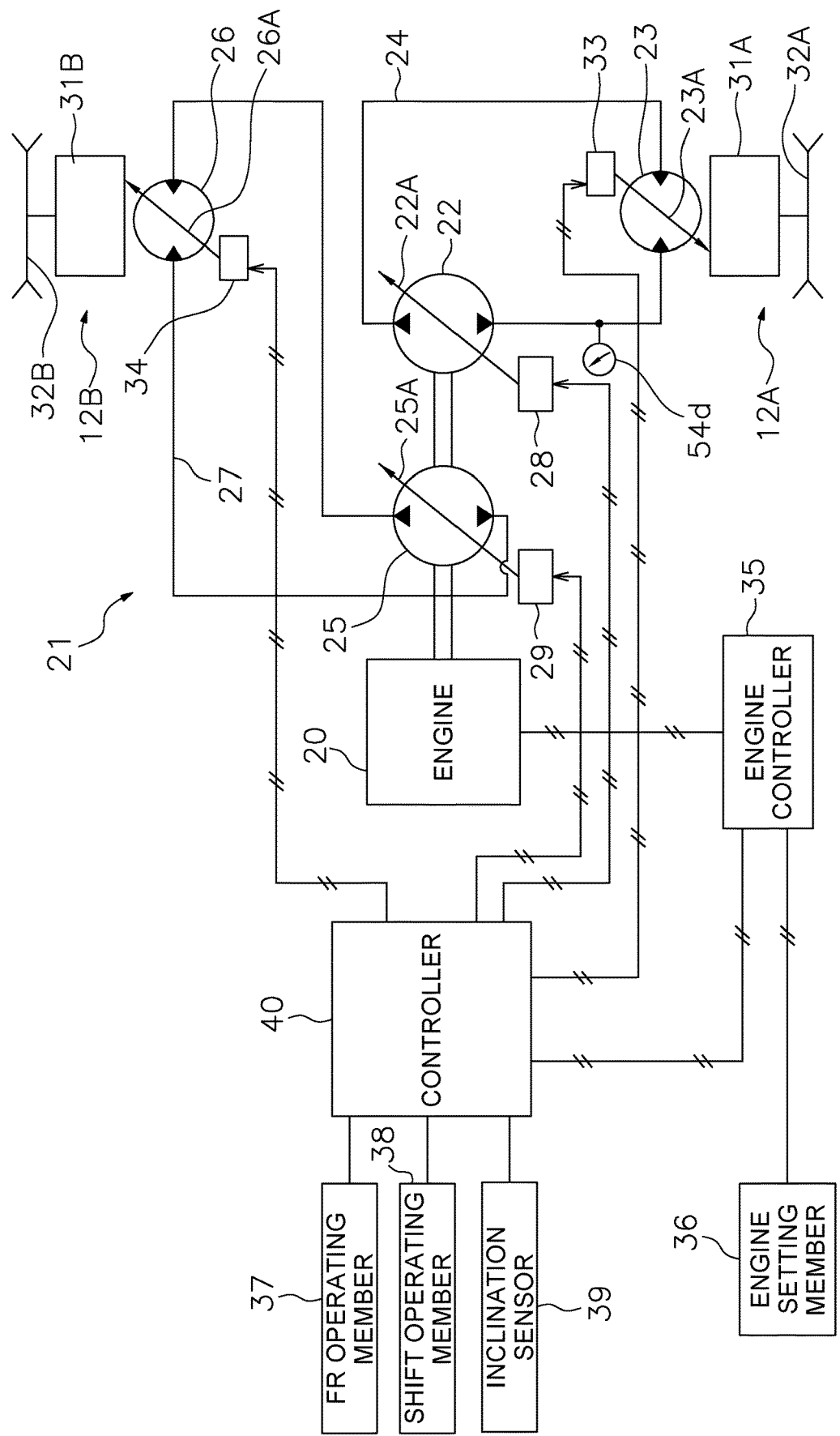
FIG. 2 is a diagram illustrating an outline of a drive system and a control system of the work vehicle.

FIG. 2 is a diagram illustrating an outline of a drive system and a control system of the work vehicle 1. As illustrated in FIG. 2, the work vehicle 1 includes an engine 20 and a hydrostatic transmission (referred to below as "HST") 21. The HST 21 includes a first hydraulic pump 22, a first hydraulic motor 23, a first hydraulic circuit 24, a second hydraulic pump 25, a second hydraulic motor 26, and a second hydraulic circuit 27. An output shaft of the engine 20 is connected to the first hydraulic pump 22 and the second hydraulic pump 25. The first hydraulic pump 22 and the second hydraulic pump 25 are driven by the engine 20 to thereby discharge hydraulic fluid.

The first hydraulic pump 22 and the second hydraulic pump 25 are variable displacement pumps. The first hydraulic pump 22 is connected to a first pump control device 28. The first pump control device 28 changes a swash plate angle 22A of the first hydraulic pump 22 thereby changing the displacement of the first hydraulic pump 22. The second hydraulic pump 25 is connected to a second pump control device 29. The second pump control device 29 changes a swash plate angle 25A of the second hydraulic pump 25 thereby changing the displacement of the second hydraulic pump 25. The first pump control device 28 and the second pump control device 29 each include, for example, a control valve and a hydraulic cylinder. The control valve may be an electromagnetic valve. Alternatively, the control valve may be a hydraulic pilot-type control valve.

The first hydraulic circuit 24 is connected to the first hydraulic pump 22. The first hydraulic motor 23 is connected to the first hydraulic pump 22 through the first hydraulic circuit 24. The hydraulic fluid discharged from the first hydraulic pump 22 is supplied to the first hydraulic motor 23 through the first hydraulic circuit 24. Consequently, the first hydraulic motor 23 is driven. The hydraulic fluid discharged from the first hydraulic motor 23 is returned to the first hydraulic pump 22 through the first hydraulic circuit 24.

The second hydraulic circuit 27 is connected to the second hydraulic pump 25. The second hydraulic motor 26 is connected to the second hydraulic pump 25 through the second hydraulic circuit 27. The hydraulic fluid discharged from the second hydraulic pump 25 is supplied to the second hydraulic motor 26 through the second hydraulic circuit 27. Consequently, the second hydraulic motor 26 is driven. The hydraulic fluid discharged from the second hydraulic motor 26 is returned to the second hydraulic pump 25 through the second hydraulic circuit 27.

The first hydraulic motor 23 is connected to the first travel device 12A. The first travel device 12A includes a first final drive gear 31A and a first sprocket 32A The first sprocket 32A is connected to an output shaft of the first hydraulic motor 23 through the first final drive gear 31A The afore-mentioned first crawler belt 16A is wound around the first sprocket 32A The rotation of the first hydraulic motor 23 is transmitted to the first crawler belt 16A through the first final drive gear 31A and the first sprocket 32A Consequently, the first crawler belt 16A is driven.

The second hydraulic motor 26 is connected to the second travel device 12B. The second travel device 12B includes a second final drive gear 31B and a second sprocket 32B. The second sprocket 32B is connected to an output shaft of the second hydraulic motor 26 through the second final drive gear 31B. The afore-mentioned second crawler belt 16B is wound around the second sprocket 32B. The rotation of the second hydraulic motor 26 is transmitted to the second crawler belt 16B through the second final drive gear 31B and the second sprocket 32B. Consequently, the second crawler belt 16B is driven.

The first hydraulic motor 23 and the second hydraulic motor 26 are variable displacement motors. The first hydraulic motor 23 is connected to a first motor control device 33. The first motor control device 33 changes a swash plate angle 23A of the first hydraulic motor 23 thereby changing the displacement of the first hydraulic motor 23. The second hydraulic motor 26 is connected to a second motor control device 34. The second motor control device 34 changes a swash plate angle 26A of the second hydraulic motor 26 thereby changing the displacement of the second hydraulic motor 26. The first motor control device 33 and the second motor control device 34 each include, for example, a control valve and a hydraulic cylinder. The control valve may be an electromagnetic valve. Alternatively, the control valve may be a hydraulic pilot-type control valve.

The work vehicle 1 includes an engine controller 35 and an engine setting member 36. The engine controller 35 controls the rotation speed of the engine 20. The engine setting member 36 is operable by an operator of the work vehicle 1. The engine setting member 36 is, for example, a dial switch. However, the engine setting member 36 may be another member, such as a lever or a pedal. The engine setting member 36 outputs an operation signal which indicates the target rotation speed of the engine 20.

The engine controller 35 includes a processor, such as a CPU, and a memory, such as a RAM or a ROM. The engine controller 35 receives the operation signal from the engine setting member 36. The engine controller 35 controls the engine 20 so that the engine rotation speed becomes the target rotation speed.

The work vehicle 1 includes an FR operating member 37, a shift operating member 38, an inclination sensor 39, and a controller 40. The FR operating member 37 and the shift operating member 38 are operable by the operator. The FR operating member 37 is, for example, a lever. However, the FR operating member 37 may be another member, such as a switch. The FR operating member 37 is operated in order to switch between forward travel and reverse travel of the work vehicle 1. The FR operating member 37 outputs an FR signal which indicates the traveling direction of the work vehicle 1.

The shift operating member 38 is, for example, a switch. However, the shift operating member 38 may be another member such as a lever. The shift operating member 38 is operated in order to set a velocity range of the work vehicle 1. The shift operating member 38 outputs a shift signal which indicates the selected velocity range from among a plurality of velocity ranges. For example, the shift operating member 38 is configured to select the velocity range from among three velocity ranges. However, the number of the velocity ranges may be less than three or more than three.

The inclination sensor 39 detects the inclination angle of the work vehicle 1. The inclination angle of the work vehicle 1 indicates the pitch angle of the work vehicle 1. That is, the inclination angle of the work vehicle 1 is the angle in the front-back direction of the work vehicle 1 with respect to a horizontal surface. The inclination sensor 39 outputs an inclination angle signal which indicates the inclination angle of the work vehicle 1. In the present embodiment, the inclination sensor 39 is an inertial measurement unit (IMU). In the present embodiment, the inclination angle of the work vehicle 1 signifies the inclination angle when traveling downhill. Therefore, the inclination angle of the work vehicle 1 indicates an angle oriented further downward than the horizontal direction.

The controller 40 includes a processor, such as a CPU, and a memory, such as a RAM or a ROM. The controller 40 receives the FR signal from the FR operating member 37. The controller 40 receives the shift signal from the shift operating member 38. The controller 40 receives the inclination angle signal from the inclination sensor 39. The controller 40 controls the first and second hydraulic pumps 22 and 25 and the first and second hydraulic motors 23 and 26 based on the FR signal, the shift signal, and the inclination angle signal.

Figure 3:
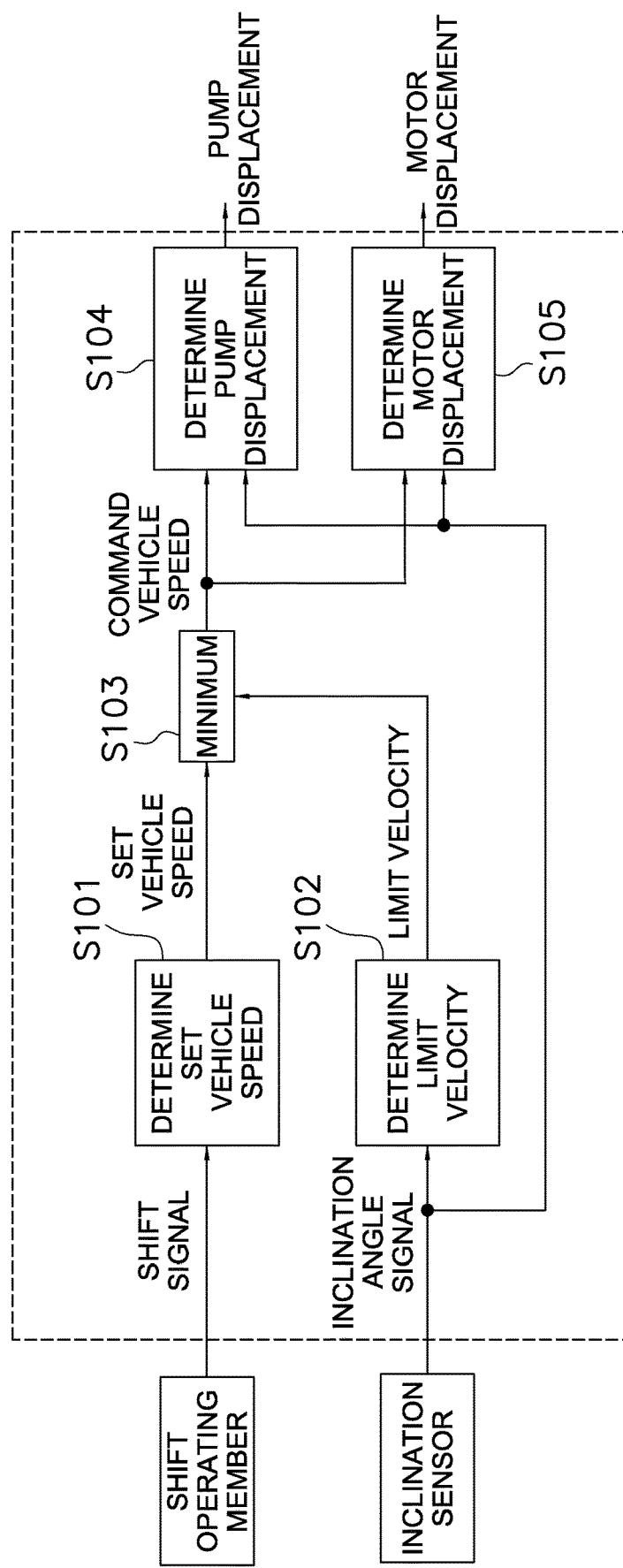
FIG. 3 is a diagram illustrating processing executed by a controller.

The control of the first and second hydraulic pumps 22 and 25 and the first and second hydraulic motors 23 and 26 by the controller 40 will be explained below. In the following explanation, a situation in which the work vehicle 1 is traveling in a straight line in the forward or reverse direction will be explained to facilitate understanding. FIG. 3 is a diagram illustrating processing executed by the controller 40. As illustrated in step S101 in FIG. 3, the controller 40 determines the set vehicle speed in accordance with the shift signal. The controller 40 stores set vehicle speed data which defines a relationship between each velocity range and the set vehicle speed. The set vehicle speed data defines a relationship between each velocity range and the set vehicle speed so that the set vehicle speed correspondingly increases in higher velocity ranges. The controller 40 refers to the set vehicle speed data and determines the set vehicle speed corresponding to the velocity range indicated by the shift signal.

In step S102, the controller 40 determines a limit velocity in accordance with the inclination angle signal. The controller 40 stores limit velocity data that defines a relationship between the inclination angle and the limit velocity of the work vehicle 1. The controller 40 refers to the limit velocity data and determines the limit velocity corresponding to the inclination angle indicated by the inclination angle signal. The limit velocity data is discussed below.

In step S103, the controller 40 determines the command vehicle speed. The controller 40 determines the smaller of the set vehicle speed and the limit velocity as the command vehicle speed. That is, the controller 40 determines the command vehicle speed so that the command vehicle speed does not exceed the limit velocity.

In step S104, the controller 40 determines the displacements of the hydraulic pumps (referred to below as "pump displacement") from the command vehicle speed and the inclination angle. In step S105, the controller 40 determines the displacements of the hydraulic motors (referred to below as "motor displacement") from the command vehicle speed and the inclination angle. The processes for determining the pump displacement and the motor displacement will be explained below. The displacement of the first hydraulic pump 22 and the displacement of the second hydraulic pump 25 are assumed to be the same. The displacement of the first hydraulic motor 23 and the displacement of the second hydraulic motor 26 are also assumed to be the same.

The controller 40 selectively executes a normal control, a control for restraining the maximum vehicle speed when traveling downhill (referred to below as "standby control"), and an overspeed prevention control, in accordance with the inclination angle of the work vehicle 1. The controller 40 determines the pump displacement and the motor displacement in the normal control when the inclination angle is less than a first threshold A1. In the normal control, the controller 40 determines the pump displacement and the motor displacement based on the first pump data and the first motor data.

Figure 4:
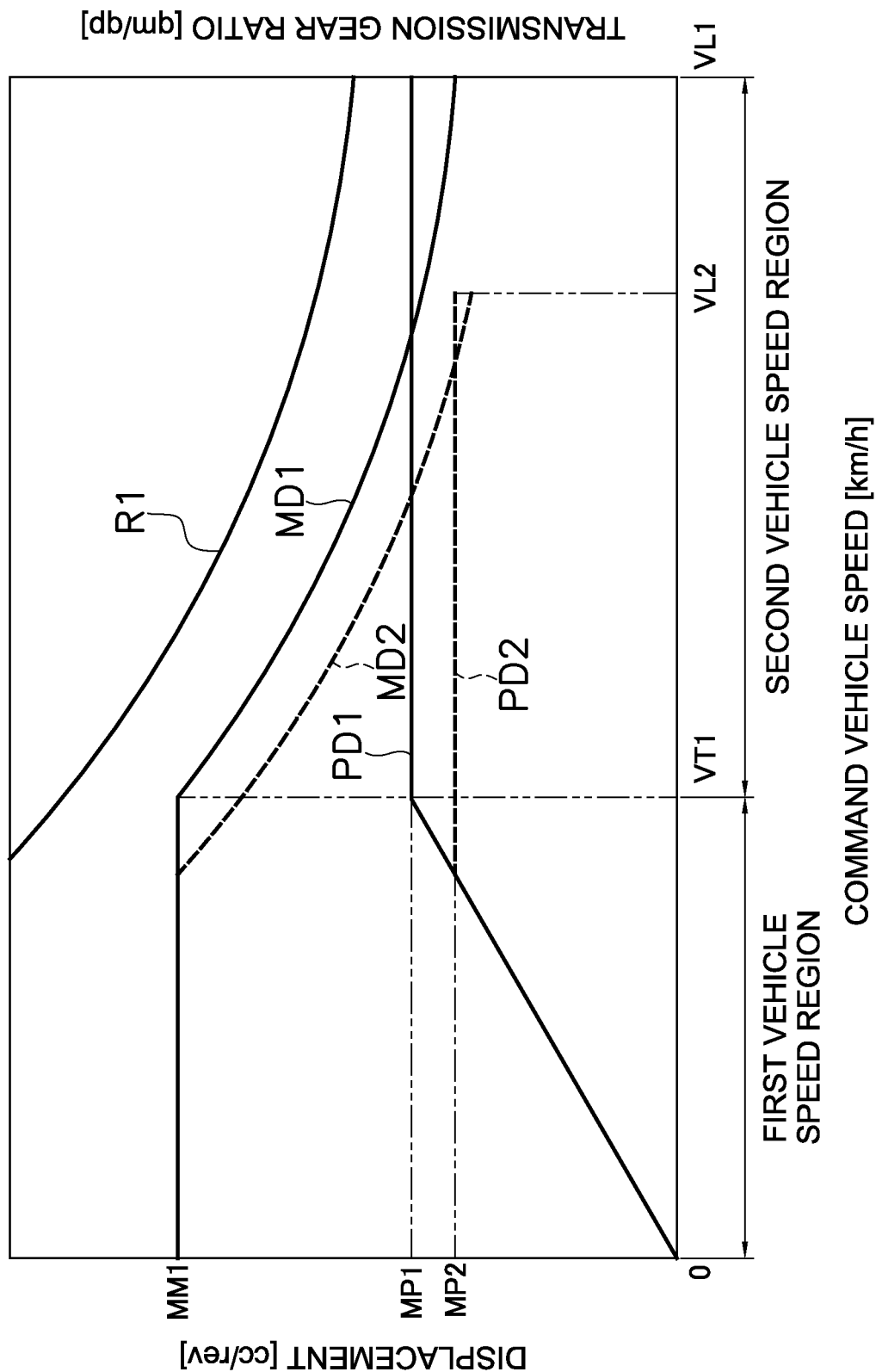
FIG. 4 is a diagram illustrating examples of pump data and motor data.

FIG. 4 is a diagram illustrating examples of first pump data PD1 and first motor data MD1. The first pump data PD1 defines a relationship between the command vehicle speed and the pump displacement. The first motor data MD1 defines a relationship between the command vehicle speed and the motor displacement. The controller 40 stores the first pump data PD1 and the first motor data MD1. In FIG. 4, R1 represents changes in the transmission gear ratio of the HST 21 with respect to the command vehicle speed. The transmission gear ratio is the ratio of the motor displacement (qm) with respect to the pump displacement (qp).

When the inclination angle is less than the first threshold A1, the controller 40 refers to the first pump data PD1 and determines the pump displacement corresponding to the command vehicle speed. When the inclination angle is less than the first threshold A1, the controller 40 refers to the first motor data MD1 and determines the motor displacement corresponding to the command vehicle speed.

The first motor data MD1 defines the fixed motor displacement at the maximum displacement MM1 while the command vehicle speed is within a first vehicle speed region. The first vehicle speed region is a range of the vehicle speed equal to or greater than zero and less than a threshold VT1. The first pump data PD1 defines a pump displacement that increases in accordance with an increase in the command vehicle speed while the command vehicle speed is within the first vehicle speed region. Therefore, while the command vehicle speed is within the first vehicle speed region, the controller 40 holds the motor displacement at a fixed displacement and controls the pump displacement thereby controlling the transmission gear ratio of the HST 21 in accordance with the command vehicle speed.

The first pump data PD1 defines the fixed pump displacement at a maximum displacement MP1 while the command vehicle speed is within a second vehicle speed region. The second vehicle speed region is a range of the vehicle speed equal to or greater than the threshold VT1. The second vehicle speed region is a range in which the command vehicle speed is greater than that of the first vehicle speed region. The first motor data MD1 defines a motor displacement that decreases in accordance with the command vehicle speed while the command vehicle speed is within the second vehicle speed region. Therefore, while the command vehicle speed is within the second vehicle speed region, the controller 40 holds the pump displacement at a fixed displacement and controls the motor displacement thereby controlling the transmission gear ratio of the HST 21 in accordance with the command vehicle speed.

When the inclination angle is equal to or greater than the first threshold A1 and less than a second threshold A2, the controller 40 determines the pump displacement and the motor displacement with the standby control. In the standby control, the controller 40 determines the pump displacement and the motor displacement based on second pump data PD2 and second motor data MD2. The controller 40 refers to the second pump data PD2 and determines the pump displacement corresponding to the command vehicle speed. The controller 40 refers to the second motor data MD2 and determines the motor displacement corresponding to the command vehicle speed.

As illustrated in FIG. 4, the second pump data PD2 defines a pump displacement smaller than that of the first pump data PD1 with respect to the command vehicle speed while the command vehicle speed is at least within the second vehicle speed region. The second pump data PD2 defines a fixed pump displacement at a maximum displacement MP2 while the command vehicle speed is within the second vehicle speed region. The maximum displacement MP2 of the second pump data PD2 is smaller than the maximum displacement MP1 of the first pump data PD1. The controller 40 may store the second pump data PD2. Alternatively, the controller 40 may generate the second pump data PD2 from the first pump data PD1.

The second motor data MD2 defines a motor displacement smaller than that of the first motor data MD1 with respect to the command vehicle speed while the command vehicle speed is at least within the second vehicle speed region. The second motor data MD2 defines a motor displacement that decreases in accordance with an increase in the command vehicle speed while the command vehicle speed is within the second vehicle speed region. The controller 40 may store the second motor data MD2. Alternatively, the controller 40 may generate the second motor data MD2 from the first motor data MD1.

The transmission gear ratio of the HST 21 with respect to the command vehicle speed defined by the second pump data PD2 and the second motor data MD2 is the same as the transmission gear ratio with respect to the command vehicle speed defined by the first pump data PD1 and the first motor data MD1. That is, the transmission gear ratio of the HST 21 based on the second pump data PD2 and the second motor data MD2 is the same as the transmission gear ratio based on the first pump data PD1 and the first motor data MD1 with respect to the same command vehicle speed.

Figure 5:
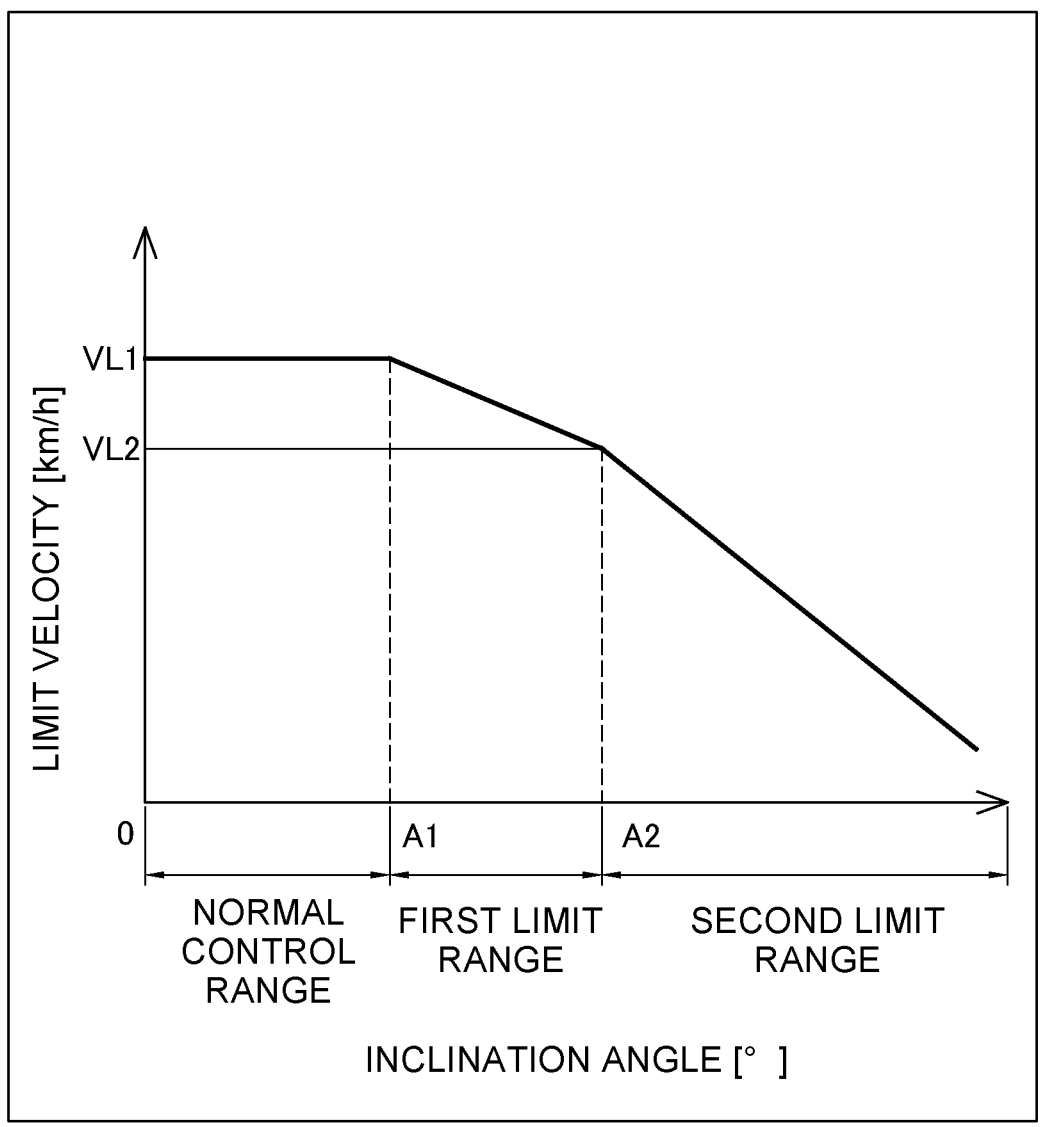
FIG. 5 illustrates an example of limit velocity data.

When the inclination angle is equal to or greater than the second threshold A2, the controller 40 determines the pump displacement and the motor displacement using the overspeed prevention control. In the overspeed prevention control, the controller 40 further reduces the limit velocity in comparison to when the inclination angle is less than the second threshold A2. FIG. 5 illustrates an example of limit velocity data. As illustrated in FIG. 5, in the limit velocity data, when the inclination angle is equal to or greater than the first threshold A1, the limit velocity falls below a first velocity VL1. The first velocity VL1 is the maximum velocity corresponding to the velocity range indicated by the shift signal. The first velocity VL1 is defined for each velocity range. When the inclination angle is equal to or greater than the first threshold A1, the limit velocity decreases as the inclination angle increases.

Specifically, when the inclination angle is within the normal control range, the limit velocity is fixed at the first velocity VL1. The normal control range is a range in which the inclination angle is equal to or greater than zero and smaller than the first threshold A1. When the inclination angle is within a first limit range, the limit velocity decreases as the inclination angle increases. The first limit range is a range equal to or greater than the first threshold A1 and less than the second threshold A2. The second threshold A2 is smaller than the first threshold A1. The controller 40 executes the above-mentioned standby control when the inclination angle is within the first limit range. In the standby control, the limit velocity decreases as far as a second velocity VL2 in accordance with an increase in the inclination angle.

When the inclination angle is within a second limit range, the controller 40 executes the overspeed prevention control. The second limit range is a range in which the inclination angle is equal to or greater than the second threshold A2. As illustrated in FIG. 5, when the inclination angle is within the second limit range, the limit velocity decreases as the inclination angle increases. The limit velocity within the second limit range is smaller than the limit velocity within the first limit range. Therefore, the controller 40 reduces the limit velocity further in the overspeed prevention control than in the standby control.

With the work vehicle 1 according to the present embodiment explained above, while the inclination angle is within the normal control range, the limit velocity is set to the first velocity VL1 corresponding to the velocity range selected with the shift operating member 38. Therefore, the operator is able to cause the work vehicle 1 to travel at the desired vehicle speed by operating the shift operating member 38.

While the inclination angle is within the first limit range, the pump displacement and the motor displacement are determined based on the second pump data PD2 and the second motor data MD2. As a result, the pump displacement and the motor displacement are reduced further than when the inclination angle is within the normal control range. Consequently, an excessive increase of the flow rate of the first and second hydraulic motors 23 and 26 due to an increase in the velocity when traveling downhill is prevented. In addition, a reduction in the operability of the work vehicle 1 is suppressed because a surplus can be applied to the first and second hydraulic motors 23 and 26 without a rapid deceleration.

While the inclination angle is within the second limit range, the limit velocity is reduced further than when the inclination angle is within the first limit range. Consequently, overspeed of the engine 20 due to an increase in the velocity when traveling downhill can be prevented.

Switching between the above-mentioned controls is evaluated according to the inclination angle detected by the inclination sensor 39. As a result, the pump displacement and the motor displacement can be reduced at an early timing when traveling downhill. Consequently, a reduction in operability is suppressed.

Although one embodiment of the present invention has been described so far, the present invention is not limited to the above embodiment and various modifications may be made within the scope of the invention. The work vehicle 1 is not limited to a bulldozer, and may be another type of work vehicle, such as a wheel loader or a dump truck and the like.

The limit velocity may be determined in accordance with another parameter and is not limited to being determined in accordance with the inclination angle. For example, the limit velocity may be determined in accordance with the engine rotation speed and the differential pressure of the hydraulic circuits.

The first pump data PD1 and the first motor data MD1 are not limited to those of the above embodiment and may be changed. The second pump data PD2 and the second motor data MD2 are not limited to those of the above embodiment and may be changed. For example, the second pump data PD2 may define a pump displacement smaller than that of the first pump data PD1 even in the first vehicle speed region. The second motor data MD2 may define a motor displacement smaller than that of the first motor data MD1 even in the first vehicle speed region.

The controller 40 may determine the pump displacement by using pump data in which the pump displacement is reduced at a plurality of steps from the first pump data in accordance with the inclination angle. The controller 40 may determine the pump displacement by using pump data in which the pump displacement is reduced continuously from the first pump data in accordance with the inclination angle. The controller 40 may determine the motor displacement by using motor data in which the motor displacement is reduced at a plurality of steps from the first motor data in accordance with the inclination angle. The controller 40 may determine the motor displacement by using motor data in which the motor displacement is reduced continuously from the first motor data in accordance with the inclination angle.

The controller 40 may be configured by a plurality of controllers. The above-mentioned processing may be distributed and executed among the plurality of controllers. The engine controller 35 and the controller 40 may also be integrated each other.

According to the present disclosure, a reduction in operability can be suppressed and an excessive increase in the flow rate of a hydraulic motor due to an increase in velocity when traveling downhill can be prevented according to the work vehicle of the present disclosure.

The invention claimed is:

1. A work vehicle comprising:
   an engine;
   a hydrostatic transmission including a hydraulic pump driven by the engine, a hydraulic circuit connected to the hydraulic pump, and a hydraulic motor connected to the hydraulic pump through the hydraulic circuit;
   a travel device driven by the hydraulic motor;
   an inclination sensor that detects an inclination angle of the vehicle; and
   a controller for controlling a displacement of the hydraulic pump and a displacement of the hydraulic motor, the controller being configured to
      determine a command vehicle speed,
      acquire the inclination angle,
      when the inclination angle is less than a first threshold, determine the displacement of the hydraulic pump from the command vehicle speed based on first pump data that defines a relationship between the command vehicle speed and the displacement of the hydraulic pump, and determine the displacement of the hydraulic motor from the command vehicle speed based on first motor data that defines a relationship between the command vehicle speed and the displacement of the hydraulic motor, and
      when the inclination angle is equal to or greater than the first threshold, determine the displacement of the hydraulic pump from the command vehicle speed based on second pump data that defines the displacement of the hydraulic pump that is smaller than that of the first pump data with respect to the command vehicle speed, and determine the displacement of the hydraulic motor from the command vehicle speed based on second motor data that defines the displacement of the hydraulic motor that is smaller than that of the first motor data with respect to the command vehicle speed.

2. The work vehicle according to claim 1, wherein
   a transmission gear ratio of the hydrostatic transmission with respect to the command vehicle speed that is defined by the second pump data and the second motor data, is the same as a transmission gear ratio with respect to the command vehicle speed defined by the first pump data and the first motor data.

3. The work vehicle according to claim 1, wherein
   the controller is further configured to
      determine the command vehicle speed so that the command vehicle speed does not exceed a limit velocity, and
      when the inclination angle is equal to or greater than a second threshold greater than the first threshold, reduce the limit velocity further than when the inclination angle is less than the second threshold.

4. The work vehicle according to claim 3, wherein the controller is further configured to reduce the limit velocity in accordance with an increase in the inclination angle.

5. The work vehicle according to claim 1, wherein the inclination sensor is an inertial measurement unit.

6. A control method for a work vehicle including a hydrostatic transmission having a hydraulic pump driven by an engine, a hydraulic circuit connected to the hydraulic pump, and a hydraulic motor connected to the hydraulic pump through the hydraulic circuit, the method comprising:
   determining a command vehicle speed;
   acquiring an inclination angle of the work vehicle;
   when the inclination angle is less than a first threshold, determining a displacement of the hydraulic pump from the command vehicle speed based on first pump data that defines a relationship between the command vehicle speed and the displacement of the hydraulic pump, and determining a displacement of the hydraulic motor from the command vehicle speed based on first motor data that defines a relationship between the command vehicle speed and the displacement of the hydraulic motor; and
   when the inclination angle is equal to or greater than the first threshold, determining the displacement of the hydraulic pump from the command vehicle speed based on second pump data that defines the displacement of the hydraulic pump that is smaller than that of the first pump data with respect to the command vehicle speed, and determining the displacement of the hydraulic motor from the command vehicle speed based on second motor data that defines the displacement of the hydraulic motor that is smaller than the first motor data with respect to the command vehicle speed.

7. The method according to claim 6, wherein a transmission gear ratio of the hydrostatic transmission with respect to the command vehicle speed that is defined by the second pump data and the second motor data, is the same as a transmission gear ratio with respect to the command vehicle speed defined by the first pump data and the first motor data.

8. The method according to claim 6, further comprising determining the command vehicle speed so that the command vehicle speed does not exceed a limit velocity, and
   when the inclination angle is equal to or greater than a second threshold greater than the first threshold, reducing the limit velocity further than when the inclination angle is less than the second threshold.

9. The method according to claim 8, further comprising reducing the limit velocity in accordance with an increase in the inclination angle.

10. The work vehicle according to claim 2, wherein the controller is further configured to
    determine the command vehicle speed so that the command vehicle speed does not exceed a limit velocity, and
    when the inclination angle is equal to or greater than a second threshold greater than the first threshold, reduce the limit velocity further than when the inclination angle is less than the second threshold.

11. The work vehicle according to claim 10, wherein the controller is further configured to reduce the limit velocity in accordance with an increase in the inclination angle.

12. The work vehicle according to claim 11, wherein the inclination sensor is an inertial measurement unit.

* * * * *